United States Patent [19]

Kikuchi

[11] Patent Number: 4,952,956
[45] Date of Patent: Aug. 28, 1990

[54] FINDER OPTICAL SYSTEM
[75] Inventor: Juro Kikuchi, Kitatsuru, Japan
[73] Assignee: Olympus Optical Co., Ltd., Tokyo, Japan
[21] Appl. No.: 406,514
[22] Filed: Sep. 13, 1989
[30] Foreign Application Priority Data Sep. 17, 1988 [JP] Japan .................. 63-233349

[51] Int. Cl.⁵ .............................. G03B 13/08
[52] U.S. Cl. ................................... 354/224
[58] Field of Search ............ 354/219, 224, 225, 155, 354/166, 199–201; 352/171

[56] References Cited

U.S. PATENT DOCUMENTS

| | | | |
|---|---|---|---|
| 2,923,196 | 2/1960 | Papke | 354/225 |
| 3,053,136 | 9/1962 | Ito et al. | 354/166 |
| 3,657,985 | 4/1972 | Uno | 354/155 |
| 4,190,338 | 2/1980 | Okuno et al. | 354/225 X |
| 4,299,462 | 11/1981 | Suzuki et al. | 354/468 |

FOREIGN PATENT DOCUMENTS 61-160712 7/1986 Japan .
61-160728 7/1986 Japan .
61-213817 9/1986 Japan .
62-34142 2/1987 Japan .
63-52114 3/1988 Japan .

Primary Examiner—Brian W. Brown
Attorney, Agent, or Firm—Cushman, Darby & Cushman

[57] ABSTRACT

A finder optical system is provided with a plurality of optical elements, a reflecting surface for indication provided on a surface of one of the plurality of optical elements, a semi-transmissive surface disposed on an object side of the reflecting surface for indication, and an optical member, changing a polarizing state of light, provided between the reflecting surface for indication and the semi-transmissive surface. The semi-transmissive surface is composed of a surface different in reflectivity and transmittance in accordance with a direction of polarization of light. This finder optical system is adapted to image light reflected form the reflecting surface for indication after reflection from the semi-transmissive surface. The finder optical system can provide relatively simple and compact structure and can bring about a bright and easily-viewed visual field in which the generation of ghost and flare is minimized.

6 Claims, 4 Drawing Sheets

FINDER OPTICAL SYSTEM

BACKGROUND OF THE INVENTION (a) Field of the Invention

This invention relates to a finder optical system suitable for compact cameras, video cameras, electronic cameras or the like.

(b) Description of the Prior Art

Finder optical systems for cameras are available in various types, each of which needs to have a function for indicating frame masks such as focus frames and field frames and to be simple and relatively compact in arrangement, so that an Albada type finder optical system shown in FIG. 1 and a bright frame type finder optical system shown in FIG. 2 have widely been used. Here, in FIG. 1, reference numeral 1 represents an objective lens unit composed of two negative lenses 2, 3 and 4 represents an eyepiece. A semi-transmissive reflecting surface is configured on an image side surface 5 of the negative lens 3 and a reflecting surface 6 for indicating the frame mask is provided on an object side surface of the eyepiece 4. Most of light coming from an object, as indicated by a solid line, is transmitted by the objective lens unit 1 and the eyepiece 4 to reach an observer's eye so that an image of the object is observed, while part of light, as indicated by a broken line, emanates from the objective lens unit 1, then reflected from the reflecting surface 6, and reflected again by the semi-transmissive reflecting surface 5 provided on the negative lens 3 to form an image of the frame mask at the same position as the object image through the eyepiece 4. As a result, the images of the object and the frame mask can simultaneously be observed within the same visual field.

On the other hand, the bright frame type finder optical system depicted in FIG. 2 is provided with a prism 9 having a half mirror 10 between the objective lens unit 1 and the eyepiece 4. Separated from this, a diffusing plate 8a and a light blocking plate 8b having an opening 8c shaped into the frame mask are arranged in parallel with the objective lens unit 1 and a reflecting mirror 7 is provided in the rear thereof. In the finder optical system of the type, light traversing the opening 8c of the light blocking plate 8b, as indicated by a broken line, is introduced into an optical path for observation through the reflecting mirror 7 and the half mirror 10, with the result that the frame mask can be viewed within the same visual field as the object.

Although, of recent years, a zoom finder has come into use even in a finder system through the spread of a camera with a zoom lens, a mechanism for indicating the focus frame and the field frame is the same as that of a conventional Albada type finder optical system or bright frame type finder optical system, except for a real image type finder optical system. For example, optical systems described in Japanese Patent Preliminary Publication No. Sho 61-213817 and Japanese Patent Preliminary Publication No. Sho 63-52114 adopt each the conventional Albada type, and Japanese Patent Preliminary Publication No. Sho 61-160728 makes use of the conventional bright frame type.

Although the merit of the Albada type finder optical system is that the optical system is compact, it has the demerit that ghost and flare are much generated to render a view difficult due to the arrangement of a half mirror with a plane surface normal to an optical axis. On the other hand, while the merit of the bright frame type finder optical system is that the optical system is devoid of the ghost and flare, it has the demerit that provision of an optical path is needed for lighting to render the optical system bulky as a whole. Moreover, it has also another demerit that since a lighting window is arranged in a position independent of the objective lens unit, an unnatural phenomenon is brought about such that the visual field is bright and the indication is not viewed or, to the contrary, the visual field is dark and the indication is brightly viewed, in accordance with the position of the window.

SUMMARY OF THE INVENTION

A primary object of the present invention is to provide a finder optical system which can excessively diminish ghost and flare in spite of comparatively simple and compact structure.

Another object of the present invention is to provide a finder optical system which accommodates the brightness of indication with that of a visual field and renders a view extremely easy.

These objects are accomplished, according to the present invention, by the arrangement that a reflecting surface for indication is provided on a surface of one of a plurality of optical elements, a semi-transmissive surface is provided on an object side from the reflecting surface for indication, and an optical member for varying a polarization state is disposed between the reflecting surface for indication and the semi-transmissive surface so that the semi-transmissive surface is constructed form a surface different in reflectivity and transmittance in accordance with the direction of polarization and, after reflected light from the reflecting surface for indication is reflected from the semi-transmissive surface, an image is formed.

According to a preferred formation of the present invention, the finder optical system is constructed as an Albada type in which a surface of one lens of the objective lens unit is configured as a polarizing half mirror, a reflection type frame mask is configured as a reflecting surface for indication on the surface, directed toward an object, of the eyepiece, and on the frame mask, a ¼λ plate coinciding in configuration therewith is provided.

According to another preferred formation, the finder optical system is constructed as a combination of the bright frame type with the Albada type which includes the arrangement of a prism, between the objective lens unit and the eyepiece, having a polarizing half mirror inclined with respect to an optical axis, the reflection type frame mask as the reflecting surface for indication and the ¼λ plate identical in configuration therewith which are provided on the surface normal to the optical axis, and a reflecting surface as a concave mirror provided under the polarizing half mirror. The reflecting surface as the concave mirror may be configured on an optical member independent of the prism. Further the ¼λ plate may be provided over the whole of the above surface normal to the optical axis and of the surface of the eyepiece facing thereto. The ¼λ plates provided on these entire surfaces may also be cemented to each other, through the frame mask sandwiched between the surfaces, by an adhesive with the same refractive index as the ¼λ plates.

According to still another preferred formation, the finder optical system is constructed as a combination of the bright frame type with the Albada type which includes the arrangement of a prism, or an image side of the objective lens unit, having the polarizing half mirror inclined with respect to the optical axis, the ¼λ plate and the reflection type frame mask provided, in order from an optical axis side, on one side in a travelling direction of incident light, coming from the object side, reflected by the polarizing half mirror, an antireflection film applied on the entire surface of the ¼λ plate except the frame mask, the ¼λ plate and the concave mirror provided, in order from the optical axis side, on the other side facing to the one side, and an image side surface curved to function as the eyepiece. Such construction makes it possible to provide the finder optical system which not only diminishes ghost and flare to the same extent as the case of the bright frame type finder optical system, but also facilitates the view of the indication and is easy in manufacture.

These and other objects as well as the features and the advantages of the present invention will become apparent from the following detailed description of the preferred embodiments when taken in conjunction with the accompanying drawing.

BRIEF DESCRIPTION ON THE DRAWINGS

DESCRIPTION OF THE PREFERRED EMBODIMENTS

Prior to the description of arrangements and functions of embodiments according to the present invention, an explanation will first be made as to a mechanism of generation of ghost and flare in an ordinary Albada type finder optical system.

Figure 1:
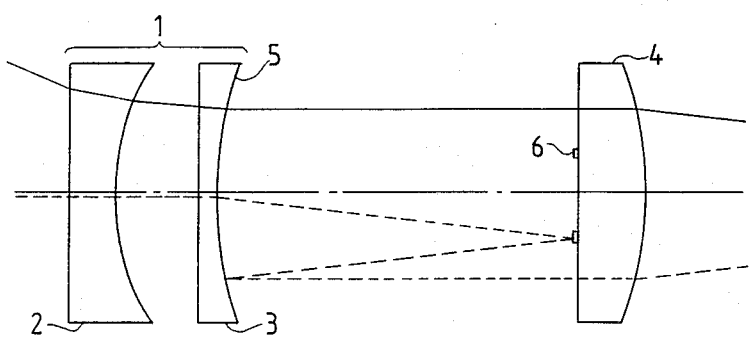
FIGS. 1 and 2 are views showing typical arrangements of conventional finder optical systems different from each other.
Figure 2:
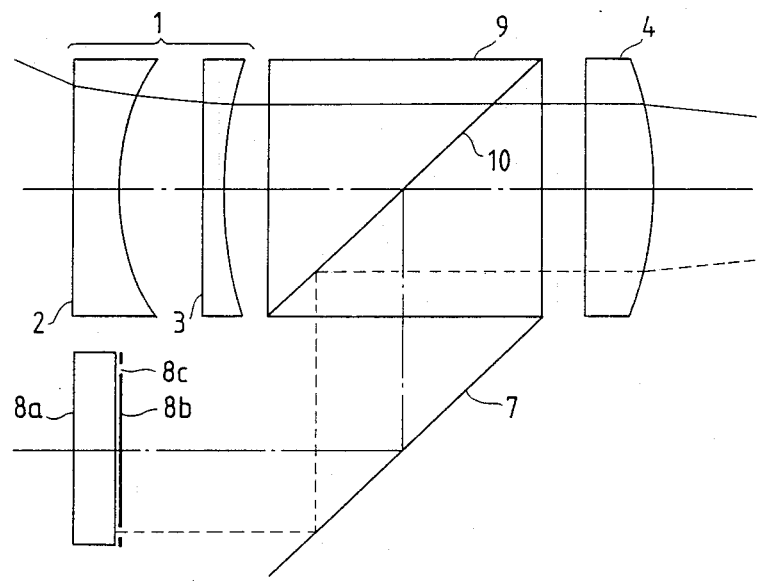
Figure 3:
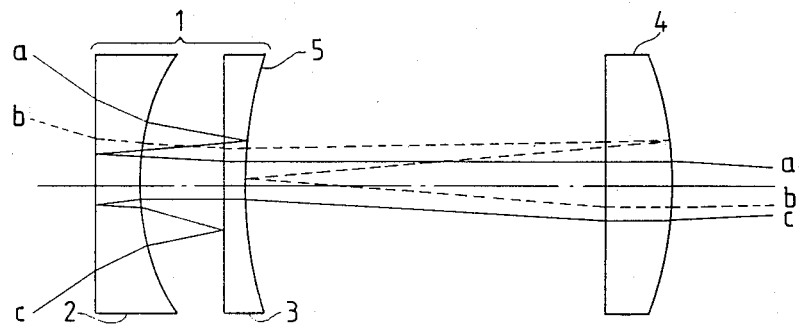
FIG. 3 is a view showing a mechanism of generation of ghost and flare in an ordinary Albada type finder optical system.

FIG. 3 shows three typical rays of light, as reference symbols a, b and c, among those which reach an observer's eye after twice-reflection from lens surfaces and generate ghost and flare in the ordinary Albada type finder optical system.

A first ray a is reflected from a primary reflecting surface which is the semi-transmissive reflecting surface 5 and a secondary reflecting surface which is an ordinary lens surface, and will be hereinafter referred to as a first class ghost-flare ray. A second ray b is reflected from the primary reflecting surface which is the ordinary lens surface and the secondary reflecting surface which is the semi-transmissive reflecting surface 5, and will be hereinafter referred to as a second class ghost-flare ray. A third ray c is reflected from the primary and secondary reflecting surfaces, both of which are the ordinary lens surfaces, and will be hereinafter referred to as a third class ghost-flare ray.

Here, an attempt will be made to consider the extent of the effects of these rays of three types on the generation of ghost and flare. The reflectivity of the semi-transmissive reflecting surface 5 is represented by $r_1$ and that of each of the remaining lens surfaces by $r_2$. Although, in fact, the reflectivities of the lens surfaces are to have the values slightly different from each other, a discussion will be started by regarding the reflectivity of each of all the remaining surfaces as $r_2$ for simplification since such differences produce very little effect on the optical system.

First, the intensity of the first class ghost-flare ray a which has been transmitted through the finder optical system will be discussed. The intensity of the ray incident on the finder optical system is taken as 1. Light is lost by $r_2$ due to reflection at a plane of incidence of the negative lens 2 (a first surface), so that the intensity of the light which has been transmitted through the first surface is $1-r_2$. Further the light is lost by $(1-r_2)r_2$ due to reflection at a plane of exit thereof (a second surface), with the result that the intensity of the light which has been transmitted through the second surface turns to $(1-r_2)-(1-r_2)r_2=(1-r_2)^2$. Similarly, after the transmission of the light through the plane of incidence of the negative lens 3 (a third surface), the intensity turns to $(1-r_2)^3$. Since the plane of exit 5 of the negative lens 3 (a fourth surface) is the semi-transmissive reflecting surface and its reflectivity is $r_1$, the intensity of the light which has been reflected from this surface comes to $(1-r_2)^3 r_1$. When the ray of light is reflected back toward an object and transmitted through the third surface in an opposite direction, the light is lost, so that the amount of the light which has been transmitted through the surface turns to $(1-r_2)^4 r_1$. Similarly, the intensity of the light which has been transmitted through the second surface in the opposite direction turns to $(1-r_2)^5 r_1$. By the reflection from the first surface, the ray of light with the intensity of $(1-r_2)^5 r_1 r_2$ travels again toward the eyepiece and passes into the intensity of $(1-r_2)^6 r_1 r_2$ after transmission through the second surface, $(1-r_2)^7 r_1 r_2$ after the third surface, $(1-r_2)^7 (1-r_1) r_1 r_2$ after the fourth surface, $(1-r_2)^8 (1-r_1) r_1 r_2$ after a fifth surface, and $(1-r_2)^9 (1-r_1) r_1 r_2$ after a sixth surface, so that the ray will reach the eye and be observed as flare. Here, if $r_1=0.5$ and $r_2=0.04$, the intensity of the flare caused by the first class ghost-flare ray a is $(0.96)^9 \cdot (0.5)^2 \cdot 0.04 \approx 0.00693$, which is approximately 0.7% of that of the incident light. Next, in regard to the travel of the second class ghost-flare ray b, when the intensity of light is calculated in the same manner as the case of the first class ghost-flare ray a, it comes finally to $(1-r_2)^7 (1-r_1) r_1 r_2$ so that the ray reaches the eye. Here, if $r_1=0.5$ and $r_2=0.04$, the intensity is $(0.96)^7 \cdot (0.5)^2 \cdot 0.04 \approx 0.0751$. Further, when the intensity of light is calculated with respect to the travel of the third class ghost flare ray c in the same manner as the case of the first class ghost-flare ray a, it comes finally to $(1-r_2)^7 (1-r_1) r_2^2$ so that the ray reaches the eye. Here, if $r_1=0.5$ and $r_2=0.04$, $(0.96)^7 \cdot (0.04)^2 \cdot 0.5 \approx 0.000601$.

In order to calculate roughly the intensity of the ghost-flare ray from the preceding explanation of the mechanism of ghost and flare generation in the Albada type finder optical system, it can be presumed that it is only necessary to replace $1-r_2$ by 1 since $r_1$ is very small in general, and pay special attention to the reflectivities of two reflecting surfaces giving rise to twice-reflection that the incident light is reflected back toward the object and reflected again toward the eyepiece. When such attention is thus paid, the reflectivity of the twice-reflection of each of the first and second class ghost-flare rays a and b is expressed by $(1-r_1)r_1r_2$ and that of the third class ghost-flare ray c by $(1-r_1)r_2^2$. Here, if $r_1=0.5$ and $r_2=0.04$, $(1-r_1)r_1r_2=0.01$, whereas $(1-r_1)r_2^2=0.0008$, and it can be said that the intensity of the third class ghost-flare ray c is about 1/10 of that of each of the first and second class ghost-flare rays a and b. Although this ratio decreases as the value of $r_1$ reduces, an excessively small ratio has no practical use because an indication system is made dark. In fact, the ghost and flare caused by the third class ghost flare ray c are hardly regarded as problems in the Albada type finder optical system. As well, the ghost and flare resulting from the ray, though bound to occur even in a bright frame type finder optical system, have no appreciable problem in the bright frame type finder optical system. This means that the ghost-flare ray with the intensity of about 1/10 or less of that of each of the first and second class ghost-flare rays a and b is almost negligible.

Further, as will be clear from the calculation discussed above, if $r_1=0.5$ and $r_2=0.04$, the intensity of a ray of light reflected once from the half mirror 5 or the ordinary lens surface will be reduced to 0.02 times and, in the case of the reflection of the ordinary lens surfaces from each other, the intensity of the ray reflected once will be reduced to 0.0016 times. From the above description, it will be noted that a ray reflected four times or more is negligible in practical use since the amount of light is diminished.

It will also be noted that if the Albada type finder optical system is constructed so that even the first and second class ghost-flare rays a and b are not produced, it becomes the finder optical system in which the generation of ghost and flare is minimized as in the bright frame type finder optical system. Thus, the present invention makes use of a polarizing half mirror (i.e., a half mirror whose reflectivity and transmittance differ with the direction of polarization) and a $\frac{1}{4}\lambda$ plate so that the first and second class ghost-flare rays are not incident on the eye.

Figure 4:
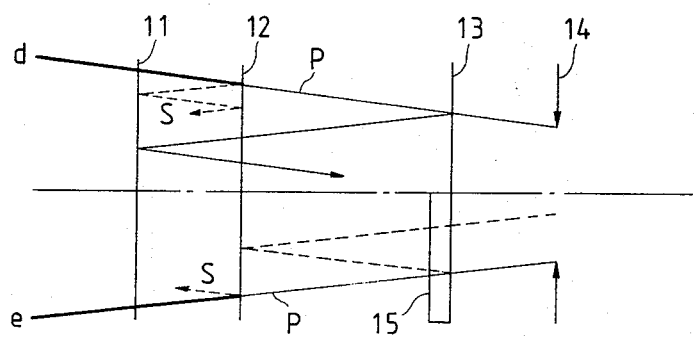
FIG. 4 is a view showing an arrangement made so that ghost-flare rays are not incident on an eye in FIG. 3.

FIG. 4 is a diagram showing typically its principle. In this figure, in order from the left hand (the light incident side), an ordinary lens surface 11, a polarizing half mirror 12, an ordinary lens surface 13 and an observer's eye 14 are arranged and a $\frac{1}{4}\lambda$ plate 15 is sticked to the lower half of the lens surface 13 in regard to an optical axis. Also, it is assumed that the polarizing half mirror 12 is the half mirror transmitting all of polarized rays of electric field vectors parallel to the plane of the drawing (each of which will be hereinafter referred to as a P ray) and reflecting all of those perpendicular to the plane of the drawing (each of which will be hereinafter referred to as an S ray), and that an optic axis of the $\frac{1}{4}\lambda$ plate 15 is such that when linearly polarized light traversing the polarizing half mirror 12 passes through the $\frac{1}{4}\lambda$ plate 15, is reflected from the lens surface 13 and passes again through the $\frac{1}{4}\lambda$ plate, the plane of polarization rotates at an angle of 90°. Further, in the figure, rays of natural light (each of which referred hereinafter to as a natural ray) which is unpolarized light are indicated by thick solid lines, the P rays by fine solid lines and the S rays by dotted lines.

An attempt will first be made to consider a ray of light forming an object image. It is a ray d depicted in FIG. 4. The natural ray comes from the object and the P ray is transmitted through and the S ray is reflected from the polarizing half mirror 12. The S ray reflected therefrom has the possibility of exhibiting the first class ghost-flare ray. However, even when the reflected S ray is again reflected from the lens surface 11 and returns to the polarizing half mirror 12, it is merely reflected again therefrom and cannot absolutely pass through the polarizing half mirror 12. Thus, the first class ghost-flare ray fails to reach the eye 14. Although, on the other hand, part of the P ray traversing the polarizing half mirror 12 is reflected from the lens surface 13, most of the ray is transmitted by the lens surface 13 and this transmitted light will form a field image. The P ray reflected therefrom has the possibility of exhibiting the second class ghost-flare ray. However, even when the reflected P ray returns to the polarizing half mirror 12, it is merely transmitted again thereby and not reflected therefrom. Thus, the second class ghost-flare ray will not be produced. However, when the ray traversing the polarizing half mirror 12 in the opposite direction is reflected from the lens surface 11, it passes through the polarizing half mirror 12 and the lens surface 13 to reach the eye 14 and as such it will be noted that the third class ghost-flare ray is generated.

Next, since a ray of light usable for an indication of the visual field relying on the Albada type finder optical system is not produced in the foregoing state, the $\frac{1}{4}\lambda$ plate 15 is employed to produce the ray. It is a ray e depicted in FIG. 4. The natural ray enters from the object and the P ray is transmitted through and the S ray is reflected from the polarizing half mirror 12. Such behavior of the ray e is the same as the case of the ray d indicating the object image. However, when the transmitted P ray traverses the $\frac{1}{4}\lambda$ plate 15 to become circularly polarized light, is reflected from the lens surface 13, and traverses again the $\frac{1}{4}\lambda$ plate 15, the plane of polarization rotates at an angle of 90° and the ray, unlike the ray d, is reflected from the polarizing half mirror 12 and reaches the eye 14 through the lens surface 13. This transmitted ray will form the image of a frame mask. It will thus be noted that the generation of ghost and flare in the Albada type finder optical system according to the present invention is diminished to such an extent as in the bright frame type finder optical system.

Figure 5:
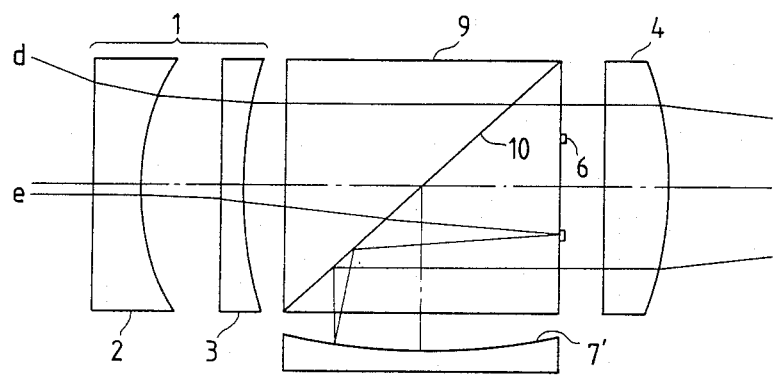
FIG. 5 is a view showing a compromise between a bright frame type finder optical system and an Albada type finder optical system.

Further, it will also be understood that from the above explanation regarding the mechanism of the generation of ghost and flare in the Albada type finder optical system, the ghost and flare are generated at a minimum in the bright frame type finder optical system in which the ray of the twice-reflection involving the half mirror dose not enter directly the eye. As such, if a compromise between the bright frame type finder optical system and the Albada type finder optical system, as shown in FIG. 5, is constructed so that a concave mirror 7' is provided at the side of the prism 9, the ray of light reflected from the reflecting surface 6 is further reflected from the half mirror 10 and conducted to the concave mirror 7' for the indication of the frame mask, and the ray reflected therefrom is again reflected from the half mirror 10 to be conducted to the observer's eye, it appears that the reflecting surface 6, as in the Albada finder, can be illuminated with the ray coming from the objective lens unit 1 of field image and the finder optical system is brought about in which the generation of ghost and flare is minimized like the bright frame type finder optical system. However, although such construction may block the first class ghost-flare ray, it cannot prevent the second class ghost-flare ray from being generated. Moreover, unfavorably, this finder optical system is such that the ray e illuminating the reflecting surface 6 is transmitted once through and reflected twice from the half mirror 10, with the result that the image of the frame mask becomes very dark as compared with that of the Albada type finder optical system. Also, even if the reflectivity of the half mirror is set so that the most bright image of the frame mask is available, the object image will become dark since the amount of the ray imaging the frame mask is as small as less than 15% of the ray of incidence. Such is given by the following formulas. However, the reflectivity of the half mirror is represented by $r(0 < r < 1)$ and, for simplification of the formulas, the reflectivity of the reflection type frame mask is assumed to be 100%, the other surface reflectivities are taken to be negligible, and it is assumed that there is no absorption of light.

(1) Brightness of the object image in the Albada type finder optical system $$X1 = 1 - r$$

(2) Brightness of the image of the frame mask in the Albada type finder optical system $$X2 = (1-r)r$$

(3) Brightness of the object image in FIG. 3

$$X3 = 1 - r$$

(4) Brightness of the image of the frame mask in FIG. 3

$$X4 = (1-r)r^2$$

According to these formulas, X1 is equal to X3. Also, X2 takes the maximum value when $r = \frac{1}{2}$, at which X1 = 0.500 and X2 = 0.250. Further, X4 takes the maximum value when $r = \frac{2}{3}$, at which $X3 \approx 0.333$ and $X4 \approx 0.147$. The darkness of the finder optical system constructed in FIG. 3 will thus be understood.

Now, in the finder optical system depicted in FIG. 5, because the ray e illuminating the reflecting surface 6 for indication of the frame mask is transmitted once through and reflected twice from the half mirror 10, the image turns dark. Accordingly, in order to prevent the image from becoming dark, the transmittance of a primary transmission is not decreased, but the reflectivity of a secondary reflection is increased and, as for blocking the second class ghost-flare ray, the transmittance of the primary transmission is increased or the reflectivity of the secondary reflection is reduced. It is thus noted that such construction brings about the finder optical system in which both the images of the object and the frame mask are bright and the ghost and flare are generated at a minimum like the bright frame type finder optical system.

Figure 6:
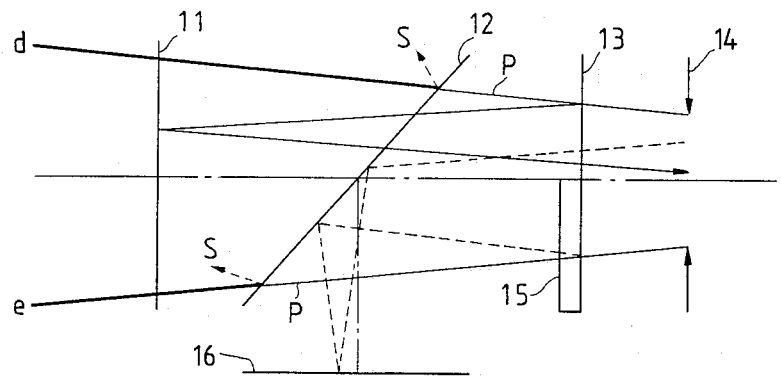
FIG. 6 is a view showing the arrangement made so that the ghost-flare rays are not incident on the eye in FIG. 5.

Here, in the compromise between the Albada type finder optical system and the bright frame type finder optical system, making use of the polarizing half mirror and the $\frac{1}{4}\lambda$ plate, FIG. 6 shows the arrangement which is devoid of the second class ghost-flare ray and renders both the object and the frame mask bright. FIG. 6 is a diagram showing typically its principle. In this figure, the lens surface 11, the polarizing half mirror 12, the lens surface 13 and the observer's eye 14 are arranged in order from the left hand side, the $\frac{1}{4}\lambda$ plate 15 is sticked to the lower half of the lens surface 13 with respect to the optical axis, and a mirror 16 reflecting back the ray reflected from the polarizing half mirror 12, toward the polarizing half mirror 12, is provided under the polarizing half mirror 12. Also, the polarizing half mirror 12 is adapted to transmit any P ray and reflect any S ray, being inclined at an angle to reflect the S ray coming from the side of the eye 14 toward the mirror 16, and the optic axis of the $\frac{1}{4}\lambda$ plate 15 is assumed to be such that when the linearly polarized light traversing the polarizing half mirror 12 travels through the $\frac{1}{4}\lambda$ plate 15, is reflected from the lens surface 13, and passes again through the $\frac{1}{4}\lambda$ plate 15, the plane of polarization rotates at an angle of 90°. Further, in the figure, the natural rays are indicated by the thick solid lines, the P rays by the fine solid lines and the S rays by the dotted lines.

An attempt will first be made to consider a ray of light in the visual field. It is the ray d shown in FIG. 6. The natural ray enters from the object and the P ray is transmitted through and the S ray is reflected from the polarizing half mirror 12. The S ray reflected therefrom is reflected to the opposite side of the mirror 16 with respect to the optical axis, so that if such treatment that the light is absorbed is applied on the opposite side of the mirror 16, the first class ghost-flare ray can be blocked. Alternatively, if only the ray reflected from the polarizing half mirror 12 strikes against a portion where the S ray strikes on the opposite side of the mirror 16 with respect to the optical axis, the portion may be provided as a mirror surface. Conversely, if the portion where the S ray strikes on the opposite side of the mirror 16 with respect to the optical axis is such that the light is diffusely reflected, a polarization state of the S ray reflected from the polarizing half mirror 12 is disturbed, with the result that the ray passes through the polarizing half mirror 12 and the portion where the S ray strikes on the opposite side of the mirror 16 is viewed with glisten. This is improper. Although, on the other hand, part of the P ray passing through the polarizing half mirror 12 is reflected form the lens surface 13, most of the ray is transmitted through the lens surface 13 and this transmitted ray will form the field image. Here, the amount of light forming the field image will be considered. Assuming that the polarizing half mirror 12 is an ideal one and the surfaces of the elements excluding the polarizing half mirror 12 and the mirror 16 reflect the light at a minimum, it will be understood that the amount of light forming the field image is $\frac{1}{2}$ of that of incidence. Also, the P ray reflected therefrom has the possibility of exhibiting the second class ghost-flare ray. However, even when the reflected P ray returns to the polarizing half mirror 12, it is merely transmitted again thereby and not reflected therefrom. Thus, the second class ghost-flare ray will not be produced. However, when the ray traversing the polarizing half mirror 12 in the opposite direction is reflected form the lens surface 11, it passes through the polarizing half mirror 12 and the lens surface 13 to reach the eye 14 and as such it will be noted that the third class ghost-flare ray is generated.

Next, since a ray of light usable for the indication of the visual field is not produced in the foregoing state, the $\frac{1}{4}\lambda$ plate 15 is employed to produce the ray. It is the ray e depicted in FIG. 6. The natural ray enters from the object and the P ray is transmitted through and the S ray is reflected form the polarizing half mirror 12.

Such behavior of the ray e is the same as the case of the ray d forming the field image. However, when the transmitted P ray traverses the ¼λ plate to become circularly polarized light, is reflected from the lens surface 13, and traverses again the ¼λ plate 15, the plane of polarization rotates at an angle of 90° and the ray, unlike the ray d, is reflected from the polarizing half mirror 12 and the mirror 16 and reach the eye 14 through the lens surface 13. This transmitted ray will form the image of the frame mask. Here, the amount of light necessary for imaging of the frame mask will be considered. Assuming that the polarizing half mirror 12 is an ideal one, the ¼λ plate has no wave dependence the mirror 16 exhibits the reflectivity of 100%, and the surfaces of the elements excluding the polarizing half mirror 12 and the mirror 16 reflect the light at a minimum, it is noted that the amount of light for the frame mask is also ½ of that of incidence.

From the above description, it will be understood that the generation of ghost and flare in the Albada type finder optical system according to the present invention is reduced to such an extent as in the bright frame type finder optical system. Further, it has been demonstrated that even in the compromise between the Albada type finder optical system and the bright frame type finder optical system, the use of the polarizing half mirror and the ¼λ plate can bring about the arrangement which eliminates the second class ghost-flare ray and renders both the object and the frame mask bright.

Although, in FIG. 4 or 6, the ¼λ plate 15 is bulkily depicted to facilitate a comprehension of the explanation, an unnecessarily large area of the ¼λ plate 15 gives rise to the ghost and flare and as such the size of the ¼λ plate 15 should be set to the same extent as the reflection type frame mask or in the case where a larger ¼λ plate 15 is employed, it becomes necessary to carry such an idea that another ¼λ plate is additionally inserted between the reflection type frame mask and the incident surface of the lens.

Also, in the finder optical system according to the present invention, it is advisable to use the polarizing half mirror 12 with a high extinction ratio and the ¼λ plate 15 rotating accurately, at an angle of 90°, the plane of polarization of the linearly polarized light traversing the polarizing half mirror 12. Further, in order to demonstrate completely the performance of the ¼λ plate 15, it is desirable that the plane of polarization of the polarizing half mirror 12 coincides correctly with the optic axis of the ¼λ plate 15. This is because, if the accuracy of the ¼λ plate 15 and of the angles of crystal axes of the ¼λ plate 15 and the polarizing half mirror 12 is low, the extinction ratio of the polarizing half mirror 12 decreases, in accordance with which the brightness of the frame mask and a removal effect of the ghost and flare reduce. Also, if a polarizing beam splitter and an analyzer are arranged in order from the incidence side and the analyzer is rotated while the natural ray enters the optical system, the intensity of the transmitted ray will vary. The ratio of the maximum value to the minimum value at this time is assumed to be the extinction ratio. The brightness of the frame mask needs the extinction ratio of at least 5 or more.

In general, the reflectivity and extinction ratio of the polarizing half mirror change in accordance with the wavelength. Also, the ¼λ plate 15 is adapted to produce correctly an optical path difference of ¼λ only with respect to a certain specific wavelength and therefore also has the wave dependency. Thus, the wave dependency of each optical element causes the coloring and brightness of the ghost and flare, frame mask, and field image to be changed, so that the wave dependency can be adjusted to change the color and brightness with the frame mask and field image. For example, the ghost and flare have the possibility that they are generated within the wave band in which the extinction ratio of the polarizing half mirror 12 is low, the filed image tends to color within the wave band in which the reflectivity of the polarizing half mirror 12 is low, and the image mask is affected by the reflectivity and transmittance of the polarizing half mirror 12 and by coloring within a specific wave band in which the ¼λ plate 15 causes the optical path difference to be correctly produced. Also, the application of an optical element making use of the polarization such as the polarizing half mirror 12 to the finder optical system may arouse various difficulties when the light of incidence is polarized. By way of example, when the incident light is polarized, the visual field or indication may disappear from view in accordance with the orientation of the plane of polarization. Moreover, if the optical element provided on the object side has photoelastic strain, the polarizing half mirror 12 turns to the analyzer and the photoelastic strain may be viewed. In order to avoid such phenomena, a polarization eliminating plate is effectively provided on the object side of the polarizing half mirror 12.

[Embodiments]

Based on the embodiments shown in the drawings, in which like reference numerals and symbols indicate like elements throughout the several figures of the prior art mentioned above, the present invention will be described in detail below.

Figure 7:
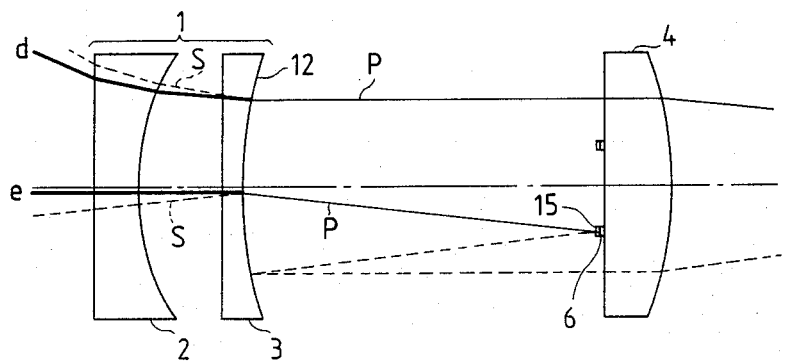
FIGS. 7 and 8 are views showing a first embodiment of a finder optical system according to the present invention.
Figure 8:
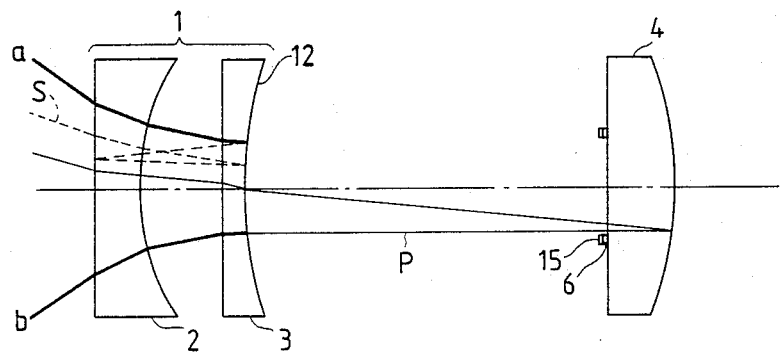

FIGS. 7 and 8 show a first embodiment, which puts the principle explained referring to FIG. 4 into practice. This embodiment is constructed so that, in the Albada finder, the use of the polarizing half mirror 12 prevents the first and second class ghost-flare rays from entering the eye with the block of the generation of ghost and flare. The polarizing half mirror 12 is the polarizing mirror transmitting the P ray and reflecting the S ray, and in these figures, the natural rays are indicated by the thick solid lines, the P rays by the fine solid lines and the S rays by the dotted lines.

The differences between the first embodiment and the ordinary Albada type finder optical system are that the first embodiment is provided with the polarizing half mirror 12 on the surface, directed toward the image side, of the negative lens 3 of the objective lens unit 1 and that it has the ¼λ plate 15 placed on the reflecting surface 6 indicating the frame mask and the orientation of the ¼λ plate 15 is set so that, when the linearly polarized light passing through the polarizing half mirror 12 traverses the ¼λ plate 15, is reflected from the reflection type frame mask 6, and traverses again the ¼λ plate 15, the plane of polarization rotates at an angle of 90°. The ¼λ plate is assumed to be located on the object side of the reflection type frame mask 6 and to take the same configuration as the frame mask 6. The ray d drawn in FIG. 7 is the ray forming the field image and the ray e is the ray indicating the frame mask. The ray a drawn in FIG. 8 is the first class ghost-flare ray and the ray b is the second class ghost-flare ray.

According to this arrangement, the field image is formed only by the P ray of the incident light and the frame mask only by the S ray of the incident light, in which the generation of ghost and flare attributable to the first and second class ghost-flare rays is not brought. Although it is understood that the third class ghost-flare ray, not shown, is produced even in such a case, it is weak in intensity and consequently has little problem. It will therefore be understood that the ghost and flare in the Albada type finder optical system of the first embodiment are diminished to such an extent as in the bright frame type finder optical system. Although the embodiment makes use of the polarizing half mirror 12 transmitting the P ray and reflecting the S ray, the use of such a polarizing half mirror 12 to transmit the S ray and reflect the P ray also brings about the same effect. The polarizing half mirror 12 applied to the embodiment, although not a general one in this case, can widely be used if a thin film is formed with a crystal having anisotropy in reflectivity and a highly polymerized film on its surface.

Figure 9:
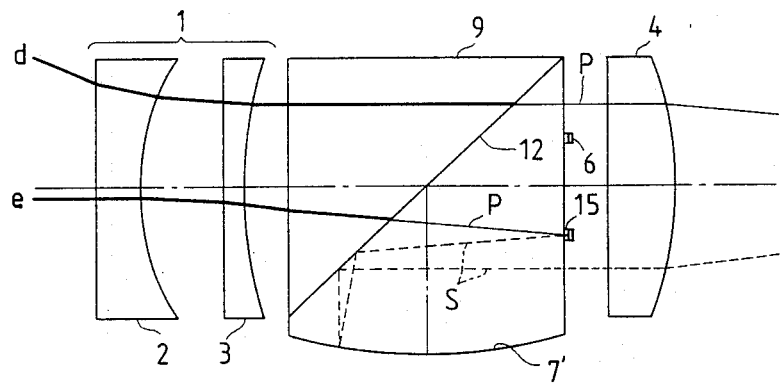
FIGS. 9 to 12 are views showing second to fifth embodiments, respectively, of the finder optical system according to the present invention.

FIG. 9 shows a second embodiment, which is constructed so that, in the compromise between the bright frame type finder optical system and the Albada type finder optical system, when the use of the polarizing half mirror 12 and the $\frac{1}{4}\lambda$ plate 15 allows the ray illuminating the reflecting surface 6 for indication of the frame mask to be transmitted once through and reflected twice from the half mirror 12, the transmittance of the primary transmission is not decreased, but the reflectivity of the secondary reflection is increased, with the result that both the field image and the frame mask become bright and the generation of ghost and flare is minimized like the bright frame type finder optical system. The polarizing half mirror 12 is the polarizing mirror transmitting the P ray and reflecting the S ray, and in the figure, the natural rays are indicated by the thick solid lines, the P rays by the fine solid lines, and the S rays by the dotted lines. The second embodiment differs from the compromise shown in FIG. 5 in that the polarizing half mirror 12 is disposed in the prism 9, that the reflecting surface 6 for indication of the frame mask is attached to the exit surface of the prism 9 through the $\frac{1}{4}\lambda$ plate 15, and that one side of the prism 9 is configured into a convex whose inner surface serves as a concave mirror for reflection. Here, the orientation of the $\frac{1}{4}\lambda$ plate 15 is such that when the linearly polarized light travelling through the polarizing half mirror 12 traverses the $\frac{1}{4}\lambda$ plate 15, is reflected from the reflection type frame mask 6, and traverses again the $\frac{1}{4}\lambda$ plate 15, the plane of polarization rotates at an angle of 90°. Also, the $\frac{1}{4}\lambda$ plate is assumed to be located on the object side of the reflection type frame mask 6 and to take the same configuration as the frame mask 6. The brightness of the field image and the frame mask in the second embodiment is expressed by the formulas as follows: However, the reflectivities of the P and S rays of the polarizing half mirror 12 are represented by $r$ and $r_s (0 < r_p, r_s < 1)$, respectively, and, for simplification of the formulas, the reflectivities of the reflection type frame mask 6 and the concave mirror are assumed to be 100% each, the other surface reflectivities are taken to be negligible, and it is assumed that there is no absorption of light.

(1) Brightness of the object image in FIG. 9

$$Y1 = 1 - r_p/2 - r_s/2$$

(2) Brightness of the image of the frame mask in FIG. 9

$$Y2 = \{(1-r_p)r_s^2 + (1-r_s)r_p^2\}/2$$

When Y1 is made constant and Y2 is calculated, Y2 has the maximum value in the case where either one of $r_p$ and $r_s$ is a zero. Further, if the reflectivity, not a zero, of the other is taken as r, the maximum value is represented by $Y2 = r^2/2$ when $Y1 = 1 - r/2$. Also, when the above formulas are used for calculation of Y2 and either one of $r_p$ and $r_s$ is 0 and the other is 1, Y2 takes the maximum value, with $Y1 = 0.5$ and $Y2 = 0.5$. Further, if $r_p = r_s$, $r_2$, like a common half mirror, takes the maximum value when $r_p = r_s = \frac{2}{3}$, with $Y1 \approx 0.333$ and $Y2 \approx 0.147$.

Since the second embodiment has the same structure as in FIG. 6, the generation of ghost and flare attributable to the first and second class ghost-flare rays is not brought. Although it is understood that the third class ghost-flare ray, not shown, is produced even in this instance, it is weak in intensity and therefore has little problem. Thus, the use of the polarizing half mirror 12 and the $\frac{1}{4}\lambda$ plate 15 according to the arrangement of the embodiment secures the finder optical system which is not provided with the lighting window necessary for the bright frame type finder optical system, minimizes the generation of ghost and flare to an extent similar to the bright frame type finder optical system, and causes the indication system as well to be easily viewed. Although the polarizing half mirror 12 transmits the P ray and reflects the S ray, like this embodiment, in most cases, the use of such a polarizing half mirror as to transmit the S ray and reflect the P ray also leads to the same effect.

Figure 10:
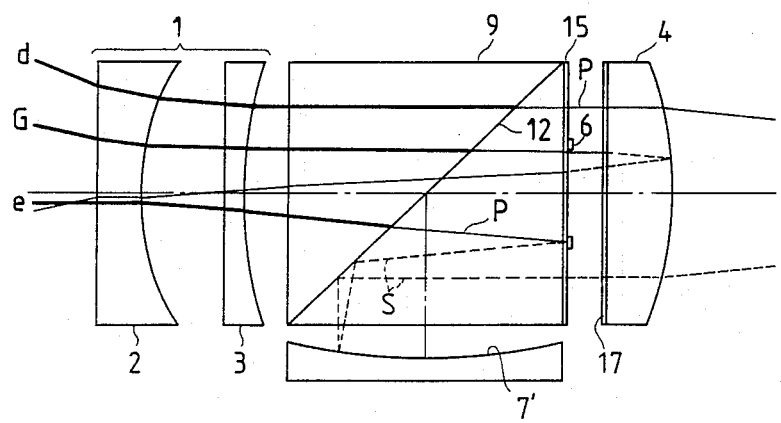

FIG. 10 depicts a third embodiment, which is constructed so that, in the second embodiment, the $\frac{1}{4}\lambda$ plate 15 is provided over the entire exit surface of the prism 9, the reflecting surface 6 is disposed on the exit side thereof, a $\frac{1}{4}\lambda$ plate 17 is further provided on the entrance surface of the eyepiece 4, the concave mirror 7' is configured separate from the prism 9. Also, in the compromise between the bright frame type finder optical system and the Albada type finder optical system like the second embodiment, while the $\frac{1}{4}\lambda$ plate 15 is located on the object side of the reflection type frame mask 6 and assumes the same shape as the frame mask 6 which is generally small in size, it is not easy that the $\frac{1}{4}\lambda$ plate 15 is put on the frame mask 6 for configuration. If, on the other hand, the $\frac{1}{4}\lambda$ plate 15 is arranged over the whole of the surface on which the frame mask 6 is provided, the ghost and flare will be generated in which the surface located on the eye side of the $\frac{1}{4}\lambda$ plate 15 is regarded as the primary reflecting surface. Like the embodiment, however, where the $\frac{1}{4}\lambda$ plate 17 is further disposed on the surface, nearest to the frame mask 6, located on the eye side, this particular problem will be obviated. Also, the polarizing half mirror 12 is the polarizing mirror transmitting the P ray and reflecting the S ray, and in the figure, the natural rays are indicated by the thick solid lines, the P rays by the fine solid lines and the S rays by the dotted lines. The polarizing half mirror 12 is the same as in the second embodiment, and the $\frac{1}{4}\lambda$ plate 15 positioned on the object side of the reflection type frame mask 6 and the $\frac{1}{4}\lambda$ plate 17 newly added in this embodiment are only different in size from each other and identical in optic axis. First of all, an attempt will be made to discuss the ray d forming the field image and the ray e indicating the frame mask. Here if the absorption of light in the $\frac{1}{4}\lambda$ plate 17 is taken to be negligible, it will be noted that a change is only a polarization state of light entering the eye and the intensity of light is the same as in the second embodiment. Next, an attempt will be made to consider a ray causing the ghost and flare in the ordinary Albada type finder optical system. A phase of the question arising here is the second class ghost-flare ray. This ray corresponds to a ray G drawn in FIG. 10. Also, the first class ghost-flare ray is not produced in the compromise between the Albada type finder optical system and the bright frame type finder optical system like the embodiment. The natural ray enters from the object and the polarizing half mirror 12 transmits the P ray and reflects the S ray. Since the ray transmitted by the polarizing half mirror 12 is in question here, attention will be directed to the P ray. Specifically, when the P ray transmitted through the polarizing half mirror 12 travels the side of the frame mask 6, it v traverses the $\frac{1}{4}\lambda$ plate 15, thus turning to the circularly polarized light. On passing through the $\frac{1}{4}\lambda$ plate 17, the ray of circularly polarized light turns to the S ray. The S ray, the reflected from the rear surface of the eyepiece 4 and passing again through the $\frac{1}{4}\lambda$ plate 17 in the opposite direction, becomes again the circularly polarized light and travels again through the $\frac{1}{4}\lambda$ plate 15 to return to the P ray. Thus, the ray, which has been transmitted through the polarizing half mirror 12, will not reach the eye. Here, when attention is directed to three surfaces, that is, the surface located on the eye side of the $\frac{1}{4}\lambda$ plate 15, the surface on the object side of the $\frac{1}{4}\lambda$ plate 17, and the lower surface of the polarizing half mirror 12, the second class ghost-flare ray reflected from each of these three surface as reflecting surfaces is produced, whereas that reflected from each of the reflecting surfaces excluding the three surfaces is not produced. Also, in the case where the second class ghost-flare ray caused by each of the three surfaces arouses problems, it is necessary only to provide on antireflection film on the each surface. Thus, according to the embodiment, the use of the $\frac{1}{4}\lambda$ plate 15 with a wide area secures the finder optical system in which the lighting window necessary for the bright frame type finder optical system is not provided, the ghost and flare are eliminated to an extent similar to the bright frame type finder optical system, and the frame mask also is easily viewed.

Figure 11:
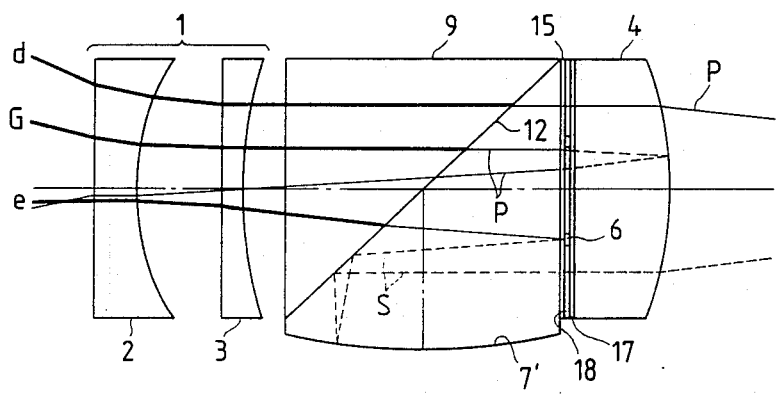

FIG. 11 shows a fourth embodiment, which is constructed so that, in the third embodiment, the prism 9 having the polarizing half mirror 12 is made integral with the concave mirror 7', and the eyepiece 4 is cemented to the prism 9 as well as the frame mask 6 of the $\frac{1}{4}\lambda$ plate 15 while a positional relationship between the frame mask 6 and the $\frac{1}{4}\lambda$ plate 17 is maintained as it is. In a space between the $\frac{1}{4}\lambda$ plates 15 and 17, an adhesive 18 with the same reflectivity as these elements is filld. Such structure eliminates one of the three surfaces allowing the generation of the second class ghost-flare ray in the third embodiment and reduces widely the reflectivities of the other two surfaces due to the cementation, with the result that the second class ghost-flare ray, unlike the case of the third embodiment, is not substantially generated and the antireflection film becomes unnecessary. Moreover, the number of parts used is reduced and the prism 9, concave mirror 7', eyepiece 4 $\frac{1}{4}\lambda$ plate 15, frame mask 6, and $\frac{1}{4}\lambda$ plate 17 can be handled as a component. Thus, according to the fourth embodiment, the finder optical system is brought about in which manufacturing is easy, cost is low, the lighting window necessary for the bright frame type finder optical system is not provided, the ghost and flare are eliminated to an extent similar to the bright frame type finder optical system, and the frame mask also is easily viewed.

Figure 12:
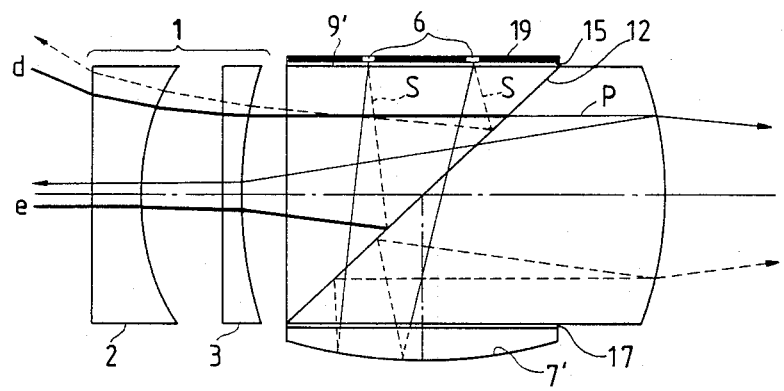

FIG. 12 shows a fifth embodiment, in which, with respect to the compromise between the Albada type finder optical system and the bright frame type finder optical system, the arrangement of the reflection type frame mask 6, concave mirror 7', and $\frac{1}{4}\lambda$ plates 15, 17 is considerably changed as compared with the preceding embodiment to render manufacturing easier. In this embodiment, on the image side of the objective lens unit 1, the $\frac{1}{4}\lambda$ plate 15 and the reflection type frame mask 6 are disposed, in order of the position nearer to the optical axis, on the side toward which the S ray resulting from the natural ray incident from the object side, after reflected from the polarizing half mirror 12, are directed, the $\frac{1}{4}\lambda$ plate 17 and the concave mirror 7' are arranged, in order of the position nearer to the optical axis, on the opposite side, an antireflection coating 19 is applied around the reflection type frame mask 6, and a prism 9' whose surface located on the image side is curved to function also as the eyepiece is arranged. The polarizing half mirror 12 is the polarizing mirror transmitting the P ray and reflecting the S ray, and in the figure, the natural rays are indicated by the thick solid lines, the P rays by the fine solid lines, and the S rays by the dotted lines. With respect to the explanation of the $\frac{1}{4}\lambda$ plates 15 and 17, the $\frac{1}{4}\lambda$ plate 15 is adapted to change the S ray, resulting from the natural ray incident from the object side, reflected from the polarizing half mirror 12, to the P ray, when the S say traverses the $\frac{1}{4}\lambda$ plate 15, is reflected from the frame mask 6, and traverses again the $\frac{1}{4}\lambda$ plate 15, while on the other hand, the $\frac{1}{4}\lambda$ plate 17 is adapted to change the P ray to the S ray when the P ray passes through the polarizing half mirror 12, traverses the $\frac{1}{4}\lambda$ plate 17, is reflected from the concave mirror 7', and traverses again the $\frac{1}{4}\lambda$ plate 17.

First, considering the ray d forming the field image, it will be noted that the field is viewed by the polarized ray P, resulting from the natural ray incident from the object side, transmitted through the polarizing half mirror 12. Next, from the discussion of the ray e indicating the frame mask, it will be noted that, as already mentioned in regard to the $\frac{1}{4}\lambda$ plates 15, 17, the frame mask 6 is illuminated and view by the S ray, resulting from the natural ray coming from the object side, reflected from the polarizing half mirror 12. Further, in relation to the ray of light responsible for the ghost and flare, the first class ghost and flare ray is not produced in the compromise between the Albada type finder optical system and the bright frame type finder optical system like the embodiment, and as such the second class ghost-flare ray will now be considered. As stated above, the natural ray comes from the object and the P ray is transmitted through and the S ray is reflected from the polarizing half mirror 12. When attention is directed to the P ray to start with, the P ray transmitted through the polarizing half mirror 12, which remains still the P ray even after the secondary reflection from the sixth surface, will be transmitted again through the polarizing half mirror 12 and will not reach the eye. Next, when attention is directed to the S ray, the S ray reflected from the polarizing half mirror 12, as already explained in relation to the $\frac{1}{4}\lambda$ plates 15, 17, reaches the sixth surface as the S ray and remains still the S ray even after the secondary reflection from the sixth surface. Then, the S ray is again reflected from the polarizing half mirror 12 and turns to the p ray by the reflection from the concave mirror 7' to be transmitted through the polarizing half mirror 12. When impinging on the frame mask 6 to be reflected therefrom, the P ray becomes the S ray and reaches the polarizing half mirror 12, with the result that the S ray is reflected back toward the object and will not reach the eye. In the case where the P ray impinges on the surface excluding the frame mask 6, though not shown, it will be absorbed in the antireflection coating 19 and will also not reach the eye. Thus according to the fifth embodiment, the use of the $\frac{1}{4}\lambda$ plates 15, 17 with wide areas secures the finder optical system in which the lighting window necessary for the bright frame type finder optical system is not provided, the ghost and flare are eliminated to an extent similar to the bright frame type finder optical system, the indication system also is easily viewed, and manufacturing is facilitated.

What is claimed is:

1. A finder optical system, comprising:
a plurality of optical elements arranged on an optical axis;
a reflecting surface for indication provided on a surface of one of said plurality of optical elements;
a semi-transmissive surface provided on the optical axis of an object side of said reflecting surface for indication; and
an optical member, changing a polarizing state of light, provided on the optical axis between said reflecting surface for indication and said semi-transmissive surface,
said semi-transmissive surface being composed of a surface different in reflectivity and transmittance in accordance with a direction of polarization of light so that light reflected from said reflecting surface for indication is imaged after reflection from said semi-transmissive surface.

2. A finder optical system according to claim 1, wherein said plurality of optical elements includes an objective lens and an eyepiece located on an image side of said objective lens, one surface of said objective lens is configured as a polarizing half mirror, a reflection type frame mask is constructed as said reflecting surface for indication on a surface, directed toward the object side, of said eyepiece, and a $\frac{1}{4}\lambda$ plate coinciding in configuration with said frame mask is provided on said frame mask.

3. A finder optical system according to claim 1, wherein said plurality of optical elements includes an objective lens, an eyepiece located on an image side of said objective lens, and a prism provided between said objective lens and said eyepiece, and said prism is inside provided with a polarizing half mirror inclined with respect to the optical axis and includes a reflection type frame mask as said reflecting surface for indication, disposed on an exit face through a $\frac{1}{4}\lambda$ plate coinciding in configuration therewith and a reflecting curved surface configured as a concave mirror which is provided on a lower side of said polarizing half mirror.

4. A finder optical system according to claim 1, wherein said plurality of optical elements includes an objective lens, an eyepiece located on an image side of said objective lens, a prism arranged between said objective lens and said eyepiece, and a concave mirror arranged under said prism, facing to said prism, said prism is inside provided with a polarizing half mirror inclined with respect to the optical axis and includes a reflection type frame mask as said reflecting surface for indication, disposed on an exit face through a $\frac{1}{4}\lambda$ plate configured over the whole of said exit face, and a $\frac{1}{4}\lambda$ plate is further provided over the whole of a surface, directed toward said exit face, on the object side of said eyepiece.

5. A finder optical system according to claim 1, wherein said plurality of optical elements includes an objective lens, an eyepiece located on an image side of said objective lens, and a prism arranged between said objective lens and said eyepiece, said prism is inside provided with a polarizing half mirror inclined with respect to the optical axis and includes a surface normal to the optical axis, covered with a $\frac{1}{4}\lambda$ plate over the whole and a reflecting curved surface configured as a concave mirror which is provided on a lower side of said polarizing half mirror, a surface of said eyepiece directed toward said surface normal to the optical axis is covered with a $\frac{1}{4}\lambda$ plate, and said prism and said eyepiece are cemented to each other, between the $\frac{1}{4}\lambda$ plates of said prism and said eyepiece, through a reflection type frame mask configured as said reflecting surface for indication and a transparent adhesive with the same refractive index as said $\frac{1}{4}\lambda$ plates.

6. A finder optical system according to claim 1, wherein said plurality of optical elements includes an objective lens and a prism arranged on an image side of said objective lens, and said prism is provided with a polarizing half mirror inclined with respect to the optical axis, a $\frac{1}{4}\lambda$ plate and a reflection type frame mask as said reflecting surface for indication which are disposed, in order of a position nearer to the optical axis, on one side toward which light, entering from an object, reflected from said polarizing half mirror is directed, an antireflection film coated on the entire surface of said $\frac{1}{4}\lambda$ plate excluding a portion of said frame mask, a $\frac{1}{4}\lambda$ plate and a concave mirror which are disposed, in order of a position nearer to the optical axis, on the other side facing to said one side, and an image side surface curved to function as the eyepiece.

* * * * *